March 5, 1968     W. H. SWEET     3,371,424

REFERENCE ATTITUDE INDICATING DEVICE

Filed March 25, 1965     2 Sheets-Sheet 1

*INVENTOR*
W. H. SWEET

INVENTOR
W. H. SWEET

United States Patent Office 3,371,424
Patented Mar. 5, 1968

3,371,424
REFERENCE ATTITUDE INDICATING DEVICE
William Harold Sweet, Ottawa, Ontario, Canada, assignor to Northern Electric Company Limited, Montreal, Quebec, Canada
Filed Mar. 25, 1965, Ser. No. 442,742
5 Claims. (Cl. 33—206)

ABSTRACT OF THE DISCLOSURE

An apparatus which translates relative bubble position in a spirit level into a corresponding electrical signal. A reference light source directs light to a bubble meniscus surface from which a portion of the light, depending on the relative bubble position, is reflected onto a light sensitive detector that produces an output signal proportional to the quantity of light reflected.

My invention is a reference attitude indicating device for alignment of machines with respect to the direction of gravity and is particularly useful in providing an electrical signal to servo-mechanisms for automatic alignment of machines.

The prior art has obtained electrical outputs from sensors such as a pendulum moving in an electrically conducting fluid to vary a resistance path to an electric current flowing through the fluid, or a bubble tube also containing an electrically conductive fluid wherein movement of the bubble changed the electrical resistance of a current through the liquid. Note that the liquid was restricted by its requirement to conduct electricity. Bubble tubes have an advantage over pendulums in providing a faster response to changes of attitude. The United States Patent 2,268,017 of Busick et al. described a levelling device using a bubble tube as a sensor wherein the bubble was located between two beams of light in the level position. The two light beams were deflected by the liquid in the bubble tube away from the photoelectric detectors when in the level position. Movement of the bubble to an off level position allowed one beam of light to pass through the bubble to fall on one photoelectric detector producing an electrical signal. Great sensitivity was not possible with this device because of the thinness of the bubble enclosed in a large radius bubble tube.

My invention is constructed with a bubble tube that may be filled with any commonly used liquid, for example, water, alcohol-water mixture, light oils, thus removing the restriction on the liquid to conduct electricity.

My invention may be made to be very sensitive because it depends on a clearly defined part of the bubble rather than on the difference in light deflecting properties between the bubble and liquid of the prior art. In a sensitive bubble tube, the radius of the bubble tube is necessarily large and the bubble so very thin as to render the prior art ineffective as a very sensitive device.

In addition, my invention can be made at lower cost than the prior art.

My invention is a reference attitude indicating device comprising a light source, such as an electric lamp; a bubble tube filled with any liquid normally used in bubble tubes; directing means to direct a portion of the light to a reference locus on the bubble tube that is coincident with the location of one end of the bubble when the bubble tube is in a predetermined attitude. This part of the bubble reflects the light shining on it towards a detecting means which detects the changing amount of light due to movement of the end of the bubble in response to a change of attitude of the bubble tube. The detecting means may be any well known device such as a photoconductive cell, photovoltaic cell, phototransistor or any equivalent device. Indicating means responsive to the detecting means indicates alignment or non-alignment of the bubble tube with the predetermined attitude.

Because I make use of optical properties of the bubble, I have removed the restriction of the bubble tube liquid to electrically conductive fluids.

My invention is more sensitive because I have made use of a clearly defined reflecting part of the end of the bubble rather than depend on a long ill-defined part of the bubble.

I have achieved a reduction in cost because my invention is made with basically economical units already available commercially, viz., bubble tube, light bulb and photoelectric diode detector; thus, the device can be manufactured with proven products to a high degree of accuracy and sensitivity exceeding $\frac{1}{10}$ of one milliradian of angle at small cost.

The invention will be fully understood by reference to the drawings.

Figure 1:
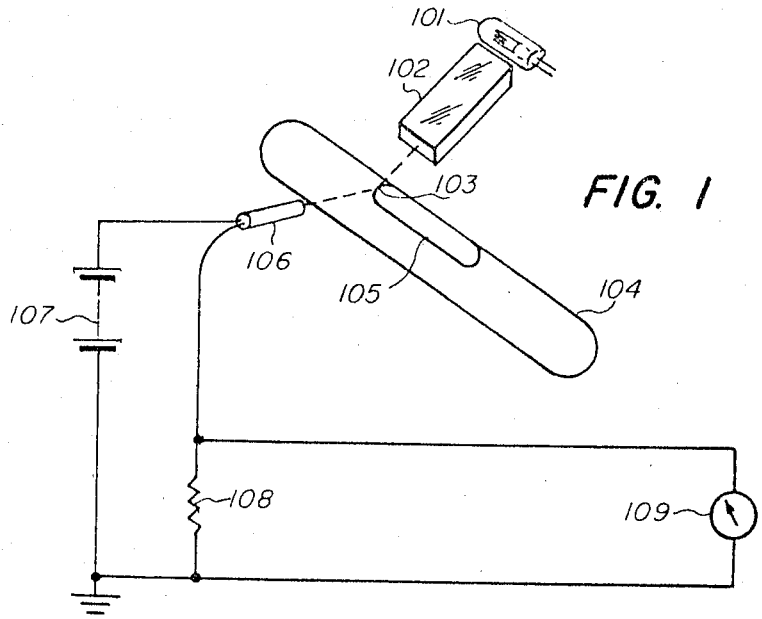
FIG. 1 is a pictorial view of one embodiment of the invention.

Referring to FIG. 1 which shows a simple embodiment of my invention, an electric lamp 101 is a light source and a piece of polystyrene sheet 102 is shaped to direct a portion of light from the lamp to a reference locus 103 on the bubble tube 104 that is coincident with the location of one end of the bubble 105 when the bubble tube is in a predetermined attitude. The polystyrene member 102 also serves as thermal isolation for the bubble tube 105 from the heat of lamp 101. A photoconductive cell 106 is positioned to detect the changing amount of light reflected from the reference locus 103 of the bubble tube due to movement of one end of the bubble in response to a change of attitude of the bubble tube. The photoconductive cell 106 is serially connected with a battery 107 and the fixed resistor 108 so that the electric current flowing in the circuit is controlled by the photoconductive cell 106. Indicating means comprising an electric meter are connected in parallel with the resistor 108 to indicate alignment or non-alignment of the bubble tube with the predetermined attitude.

Figure 2:
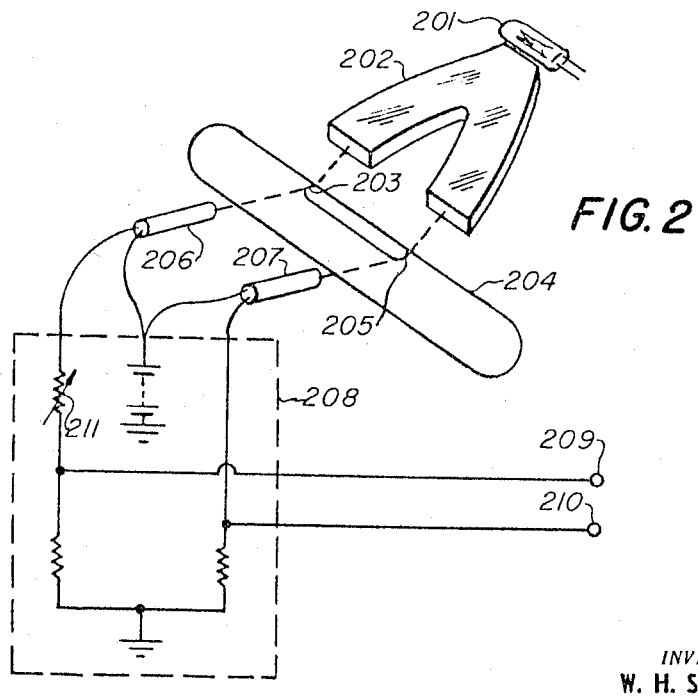
FIG. 2 is a pictorial view of my preferred embodiment of the invention.

Referring now to FIG. 2 this shows my preferred embodiment of the invention. It comprises a light source 201, being an electric lamp, with a directing means 202 formed from polystyrene sheet to direct a first portion of the light to a first reference locus 203 on a bubble tube 204 and to direct a second portion of the light to a second reference locus 205 on the bubble tube 204. By using a single light source, any reduction in the first position of light will be matched by a reduction in the second portion of light. The first reference locus 203 and the second reference locus 205 are coincident with the location of one end of the bubble and the location of the other end of the bubble respectively, when the bubble tube is in a predetermined attitude.

A first detecting means 206 is a photoconductive cell for detecting the changing amount of light reflected from the first reference locus 203 due to movement of one end of the bubble in response to a change of attitude of the bubble tube; similarly, a second detecting means 207 is also a photoconductive cell for detecting the changing amount of light reflected from the second reference locus 205 due to movement of the other end of the bubble in response to the change of attitude of the bubble tube. An indicating means comprising a well known bridge circuit 208 is used to compare the outputs of the photoconductive cells to produce a difference signal indicative of the alignment or non-alignment of the bubble tube at the output terminals 209 and 210. Variable resistor 211 is an adjustment to correct for variations in individual photoconductive cells. The positioning of the light source, directing means, reference loci and detecting means will now be shown.

Figure 3:
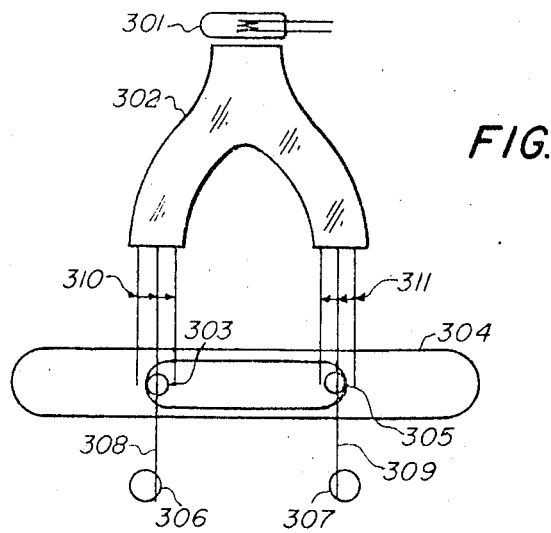
FIGS. 3 and 4 show details of the alignment of the components of my preferred embodiment.

Referring to FIG. 3, 301 is a light source corresponding to 201 of FIG. 2, 302 is a directing means corresponding to 202, 303 is a first reference locus corresponding to 203, 304 is a bubble tube corresponding to 204, 305 is a second reference locus corresponding to 205, 306 is a first detecting means corresponding to 206, and 307 is a second detecting means corresponding to 207. FIG. 3 shows the bubble tube in a predetermined attitude: the first 306 and second 307 detecting means are positioned so that the reflected rays 308 and 309 of the first 310 and second 311 portions of light impinge upon the detecting means 306 and 307 respectively. It will be seen, further, that the reflected rays impinge to the sides of the detecting means: in this illustration, the sides are those sides mutually towards the other detecting means. The reason for this will be clear from a consideration of FIG. 4.

Figure 4:
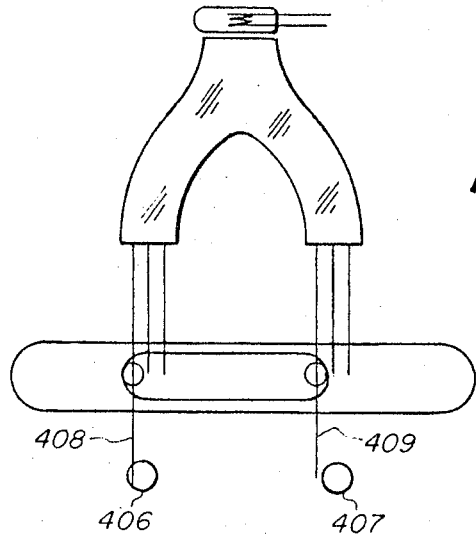

Referring now to FIG. 4, this shows the bubble tube moved away from the predetermined attitude and is numbered similarly to FIG. 3. It will be seen that while the reflected ray 408 does impinge on the detecting means 406, the other reflected ray 409 does not impinge on the detecting means 407: thus there will be a difference in the electric currents flowing in each arm of the bridge circuit shown in FIG. 2 at 208. A difference signal will therefore appear at the output terminals 209 and 210 for use in a servo-mechanism for restoration of the bubble tube to its predetermined attitude.

In both embodiments of my invention, the polystyrene directing means serves as a thermal insulator to reduce changes of bubble size due to heat from the electric lamp. My preferred embodiment shown in FIG. 2 can tolerate small changes of bubble size because both ends of the bubble will be equally affected: the outputs of the photoconductive cells will be equally affected so that the bridge circuit will continue to produce a difference signal.

What is claimed is:
1. A reference attitude indicating device comprising:
    (a) a light source;
    (b) a bubble tube;
    (c) directing means, to direct a first portion of the light to a first reference locus on the bubble tube that is coincident with the location of the meniscus at one end of the bubble when the bubble tube is in a predetermined attitude;
    (d) first detecting means for detecting light reflected from said meniscus, the amount of light detected varying due to movement of the bubble in response to a change of attitude of the bubble tube; and
    (e) indicating means, responsive to the first detecting means, for indicating alignment or non-alignment of the bubble tube with the predetermined attitude.
2. A reference attitude indicating device as defined in claim 1 wherein:
    (a) the directing means directs a second portion of the light to a second reference locus on the bubble tube that is coincident with the location of the meniscus at the other end of the bubble when the bubble tube is in the predetermined attitude;
    (b) a second detecting means detects light reflected from the meniscus at the other end of the bubble, the amount of light detected varying due to said movement of the bubble.
3. A reference attitude indicating device as defined in claim 1 wherein the detecting means are photoelectric cells.
4. A reference attitude indicating device as defined in claim 2 wherein:
    (a) each detecting means is a photoconductive cell, and
    (b) the indicating means is a bridge circuit comparing the outputs of the photoconductive cells to produce a difference signal indicative of the alignment of the bubble tube.
5. A reference attitude indicating device as defined in claim 2 wherein the detecting means are photoelectric cells.

References Cited
UNITED STATES PATENTS

| | | | |
|---|---|---|---|
| Re. 20,823 | 8/1938 | Goodwin | 250—210 |
| 2,252,727 | 8/1941 | Pepper | 33—206.5 |
| 2,268,498 | 12/1941 | Bryce | 250—226 |
| 2,879,405 | 3/1959 | Pankove | 250—211 |
| 3,120,125 | 2/1964 | Vasel | 73—293 |

LEONARD FORMAN, *Primary Examiner.*

LLOYD V. ANDERSON, *Assistant Examiner.*